United States Patent [19]

Ackerman

[11] 4,286,670
[45] Sep. 1, 1981

[54] COMBINATION TILLER AND CULTIVATOR AND DRIVE CONTROL THEREFOR

[75] Inventor: Donald W. Ackerman, East Greenbush, N.Y.

[73] Assignee: Garden Way Incorporated, Charlotte, Vt.

[21] Appl. No.: 967,411

[22] Filed: Dec. 7, 1978

[51] Int. Cl.³ .................. A01B 33/02; B62D 51/04
[52] U.S. Cl. ................... 172/42; 180/19 R; 74/532; 74/551.1
[58] Field of Search .............. 172/42, 43, 125; 180/19 R, 19 S, 19 H, 77 HT; 74/220, 355, 404, 551.3, 551.6, 551.7

[56] References Cited

U.S. PATENT DOCUMENTS 3,738,441  6/1973  Kemner .......................... 180/19 H

FOREIGN PATENT DOCUMENTS 533559   2/1941  United Kingdom .............. 180/19 R
903296   8/1962  United Kingdom .............. 172/42
1006439  9/1965  United Kingdom .............. 172/125

*Primary Examiner*—Richard T. Stouffer
*Attorney, Agent, or Firm*—Hayes & Reinsmith

[57] ABSTRACT

A handle bar for a power operated machine has two operating positions in inverted relation to one another. A forward and reverse drive control is mounted on the handle bar for movement in each handle bar position from a neutral position toward and away from an operator into reverse and forward operative positions respectively for actuating a power transmission to effect machine movement in corresponding reverse and forward directions.

8 Claims, 7 Drawing Figures

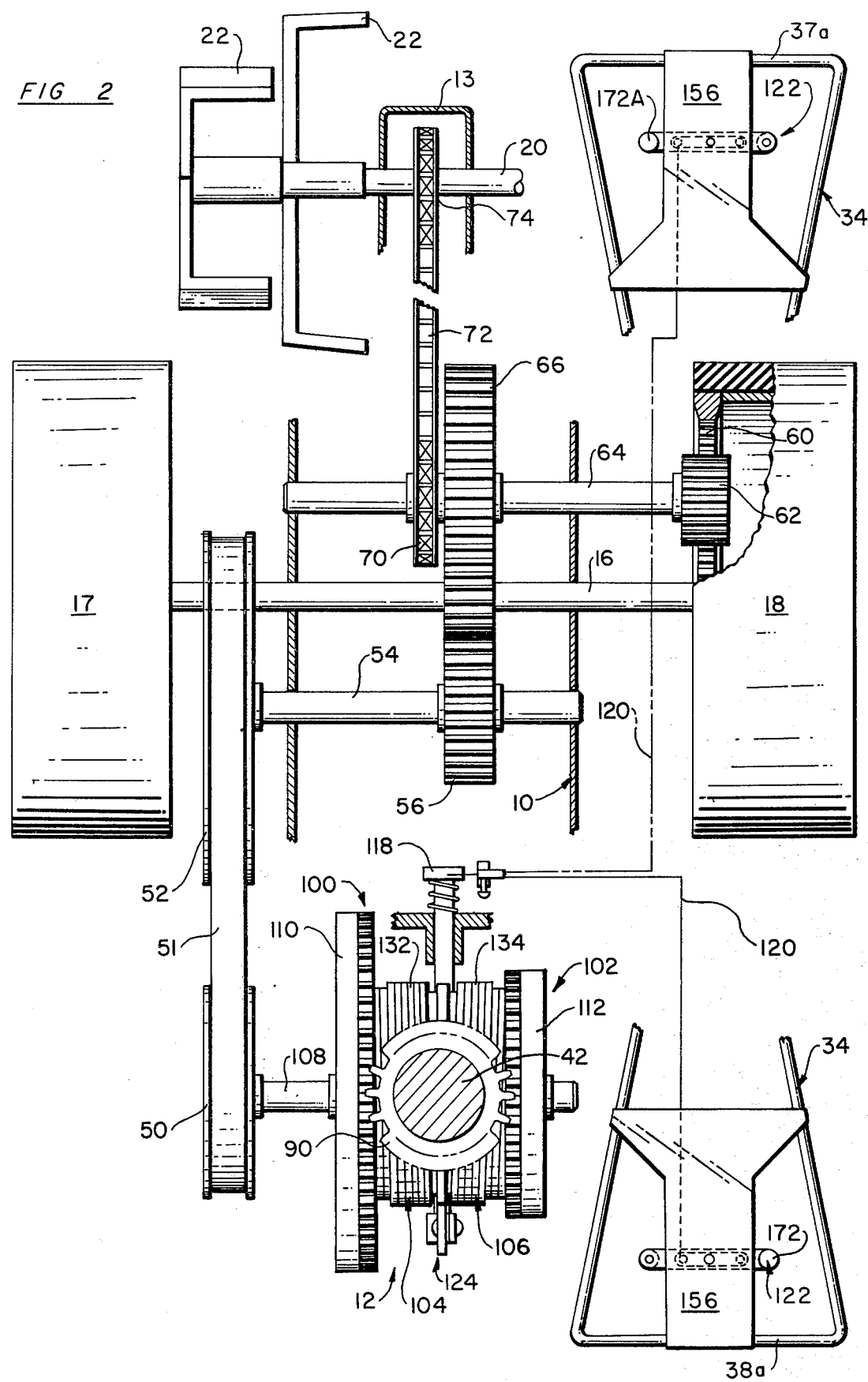

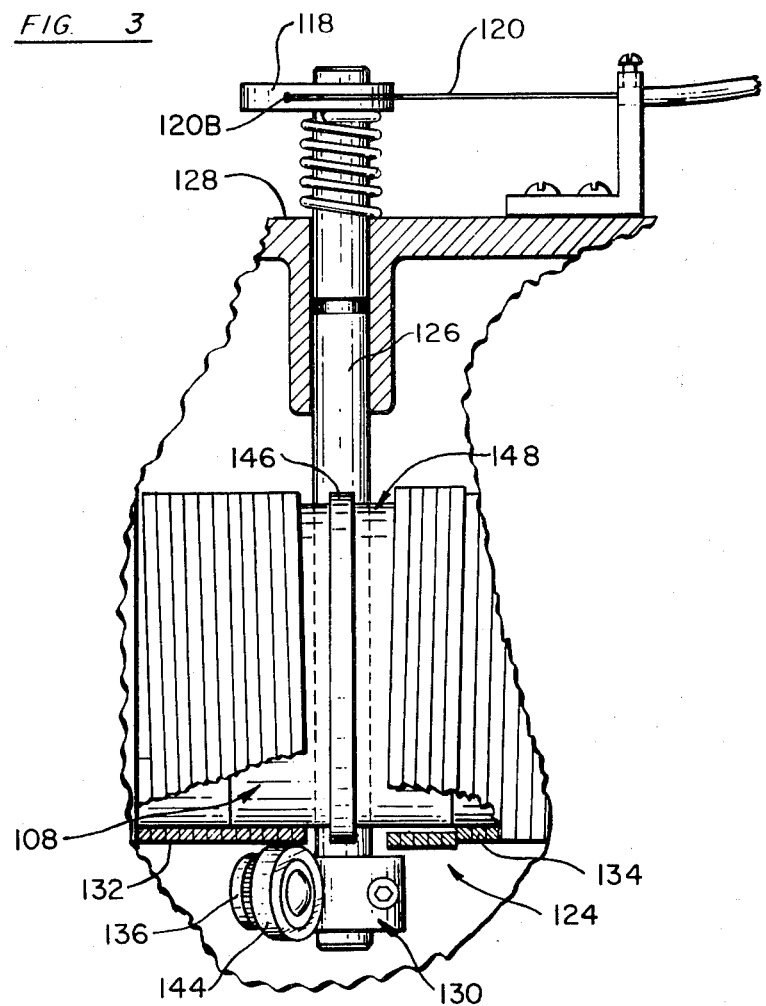
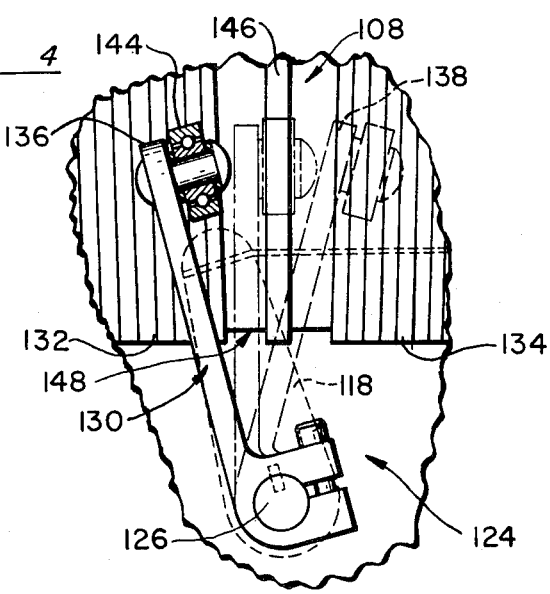

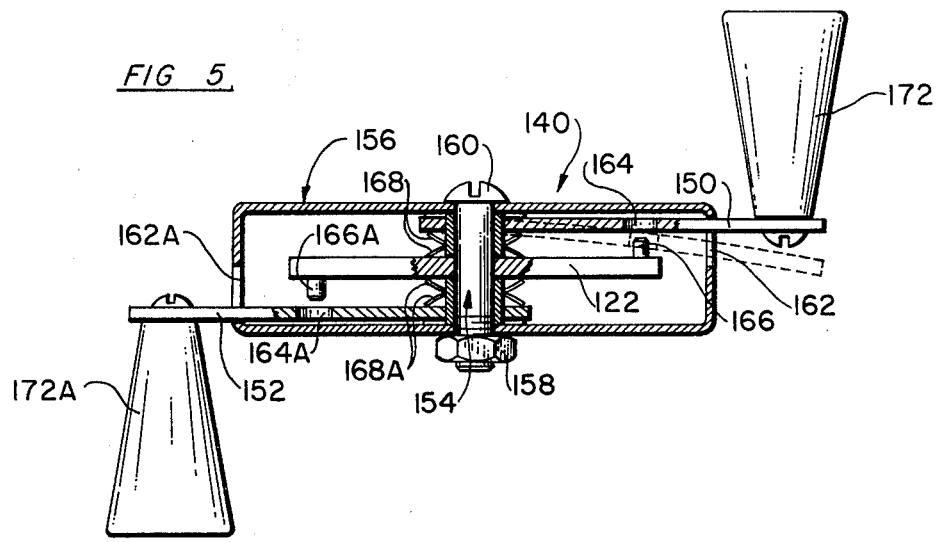
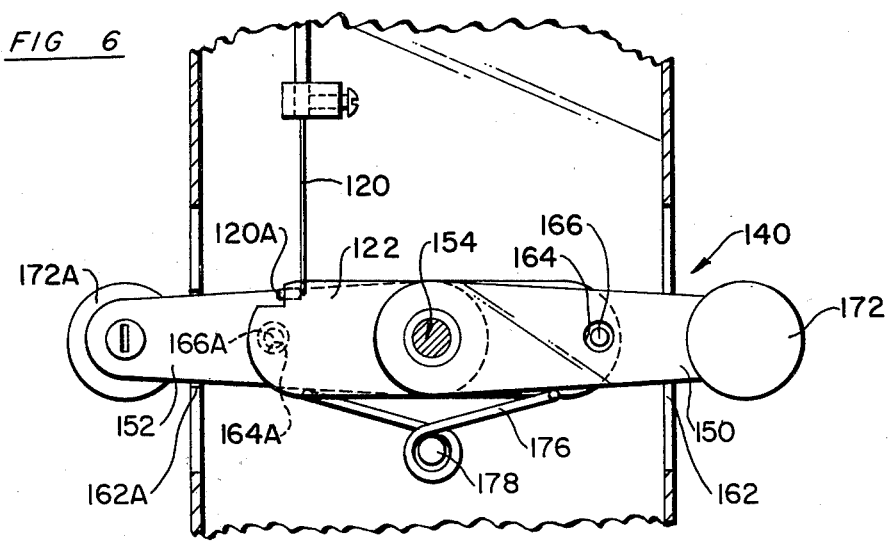
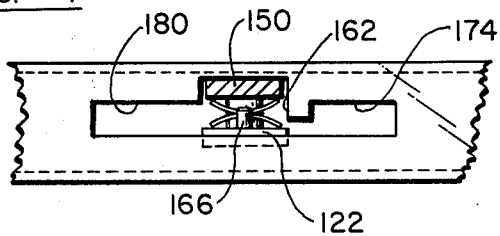

COMBINATION TILLER AND CULTIVATOR AND DRIVE CONTROL THEREFOR

This invention generally relates to earthworking machines and particularly concerns a drive control for a combination tilling and cultivating machine.

A primary object of this invention is to provide a new and improved drive control for use in an earthworking machine for drivingly connecting input and output drives of the machine through a selected one of a pair of power take-off assemblies of the transmission for respectively driving the output drive in opposite angular directions.

Another object of this invention is to provide such a drive control of simplified but rugged construction which is manually actuated for engaging and disengaging a drive train to operate the tines of the machine in a predetermined angular direction.

Yet another object of this invention is to provide a new and improved drive control for a combination tilling and cultivating machine and which is quickly and easily operated manually for selecting the direction of rotation of the tines of the machine and, if desired, the wheels of the machine, for operation thereof in either rear tine or front tine modes.

A further object of this invention is to provide a drive control of the above described type which is economical to manufacture for reliable operation over an extended service life under demanding conditions and capable of promoting a desired operating flexibility to a combination tilling and cultivating machine incorporating the drive control.

Other objects will be in part obvious and in part pointed out more in detail hereinafter.

A better understanding of this invention will be obtained from the following detailed description and the accompanying drawings of an illustrative application of this invention.

In the drawings:

FIG. 2 is a schematic view, partly broken away and partly in section, showing a power drive train for delivering engine power to both the wheels and tines of the machine of FIG. 1;

FIG. 3 is an enlarged view, partly broken away and partly in section, showing clutch components of two power takeoff assemblies incorporated in the machine of FIG. 1;

FIG. 4 is an enlarged schematic view, partly broken away and partly in section, showing an actuator for the clutch components of FIG. 3 and illustrating the actuator in different actuating positions;

FIG. 5 is an end view, partly in section and partly broken away, showing a drive control incorporated in the combination tilling and cultivating machine of FIG. 1;

FIG. 6 is a top view, partly broken away and partly in section, showing the drive control of FIG. 5; and FIG. 7 is an end view, partly broken away and partly in section, of the drive control of FIG. 5.

Figure 1:
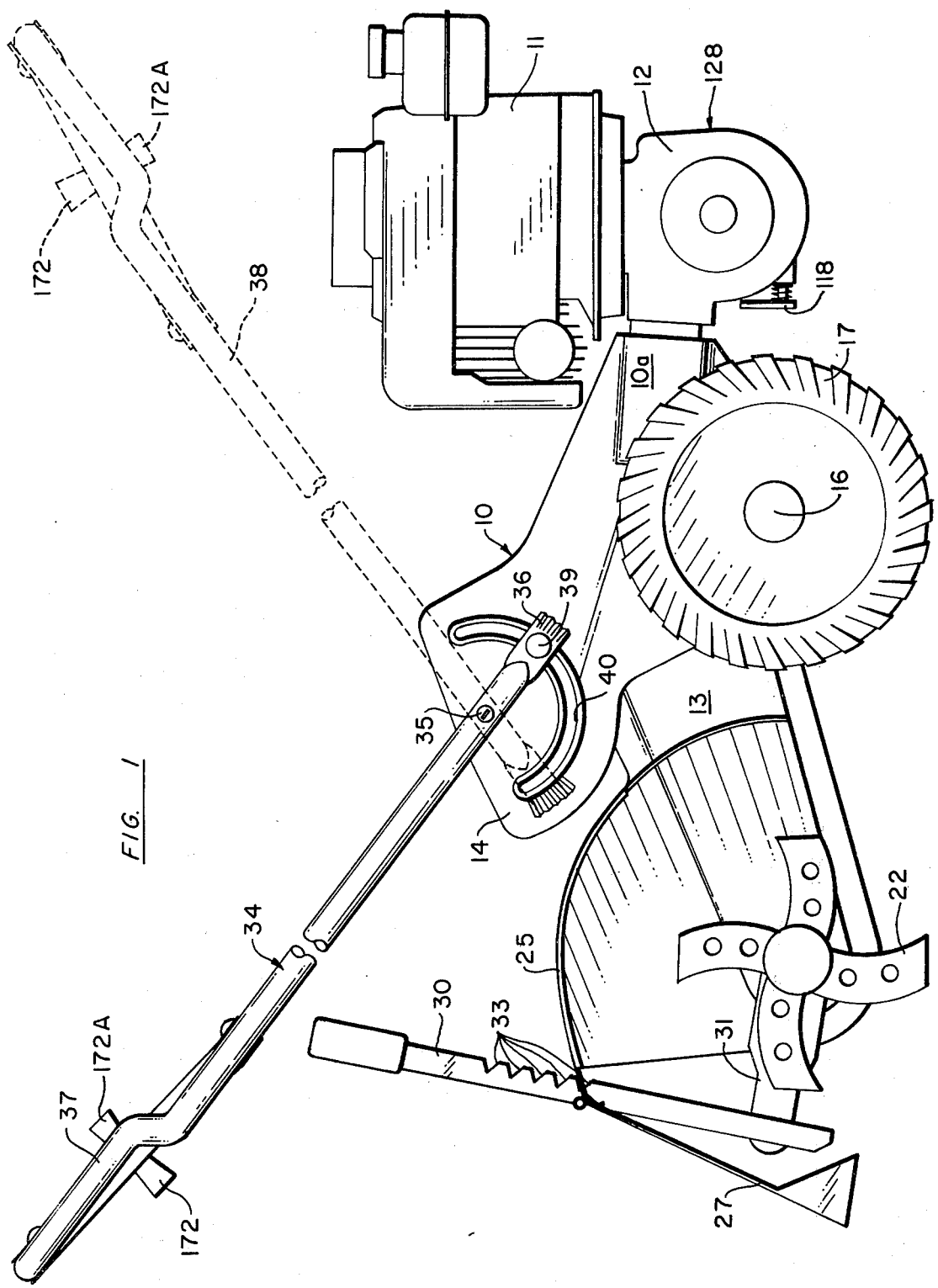
FIG. 1 is a side elevational view, partly broken away, showing a combination tilling and cultivating machine of a type wherein the drive control of this invention is particularly suitable to be used.

Referring now to the drawings in detail, FIG. 1 shows a self-powered, user guided combination earthworking machine capable of performing both rear end tilling and front end cultivating functions. The machine includes a main frame 10 which frame includes suitable mounting provisions at one end 10a for a gasoline engine 11 and a power transmission 12. A chain case 13 is welded to the other end of frame 10. Handle mounting members 14 are formed as integral extensions on each side of frame 10.

Frame 10 also supports in a conventional manner a drive axle 16 which supports wheels 17 and 18 in driving engagement therewith. Chain case 13 supports axle 20 in a conventional manner. Axle 20 has a plurality of pairs of earthworking implements or tines 22 fixed on opposite ends of the axle 20 for rotation with that axle. Frame 10 through its chain case 13 also supports a hood 25 which encloses tines 22. Hood 25 serves to support safety flap 27 which also encloses tines 22.

A depth of cut adjustment lever 30 is pivotally connected to arm 31 which in turn is journaled on shaft 20; through a suitable detent arrangement 33, the depth of which the tines 22 can penetrate the earth is easily controlled.

Attached to the spaced upwardly extending handle mounting members 14 is a generally U-shaped handle bar 34 pivotally supported on each handle mounting member 14 by fastener 35. To effect handle height adjustment, handle bar 34 and its end extension 36 may be constructed so as to be longitudinally adjustable relative to one another. End extension 36 is shown having a serrated end which cooperates with mating surface deformities on the handle mounting members 14 to permit handle bar 34 to be fixedly secured by a suitable clamp 39 in each of two positions, the solid line position 37 and the dotted line position 38. Handle pivotal movement is acommodated by a generally semicircular slot 40 formed in mounting members 14 which cooperates with a bolt forming part of clamp 39.

The foregoing general orientation of parts corresponds to an earthworking machine as described and disclosed in copending U.S. patent application Ser. No. 967,415 filed Dec. 7, 1978, now abandoned, in the name of George W. Done entitled "Combination Cultivator and Tilling Apparatus" and assigned to the assignee of this application.

Engine 11 can be any conventional power source, gasoline, electric or the like, the output shaft 42 (FIG. 2) of which is connected through power transmission 12 to output pulley 50. Belt 51 extends from pulley 50 to driven pulley 52 mounted on shaft 54. Shaft 54 is mounted for rotation in frame 10. Drive gear 56 is secured on shaft 54. In the described embodiment, wheel 18 is provided with a ring gear 60 around its inner rim which ring gear 60 is in direct driving engagement with wheel drive pinion 62 fixedly secured to wheel input shaft 64 suitably journaled in frame 10 in parallel spaced relation to shafts 16 and 54. Wheel input shaft 64 has fixed thereon driven gear 66 in continuous meshing engagement with drive gear 56. Sprocket 70 is also fixed to wheel input shaft 64 and cooperates with chain 72 to establish a driving connection to driven sprocket 74 supported on shaft 20.

The solid line position 37 of handle 34 in FIG. 1 and the handle position shown as 37a in the upper part of the power train schematic of FIG. 2 is the handle position for rear end tilling. For rear end tilling, the handle 34 is in overlying relation to tines 22, and wheels 17, 18 and tines 22 are normally rotatably driven in a clockwise direction as viewed in FIG. 1.

When it is desired to operate the machine in a front end mode for cultivating, it is merely necessary to release clamp 39 and rotate handle 34 to the dotted line position 38 in FIG. 1 (also shown in the lower part of the power train schematic of FIG. 2 at 38a) and to again re-engage clamp 39 so that handle 34 is locked in position. If desired, the depth adjustment lever 30 then can be raised and safety flap 27 can be raised to permit maximum front end exposure for the rotating tines 22. It is, however, necessary that the direction of rotation of the wheels 17, 18 and tines 22 be reversed to provide counterclockwise rotation thereof as viewed in FIG. 1.

To effect power transmission in reversible modes while utilizing only a single input pinion 90 driven in one constant angular direction by motor output shaft 42 (which serves as the input drive to the transmission 12 from engine 11), the power transmission 12 includes first and second power take-off assemblies 100, 102 between the input drive 42 and output drive for respectively driving the tines 22 in opposite angular directions. Each assembly 100, 102 has a clutch 104, 106 which is selectively operable independently of the other clutch for drivingly connecting the input drive 42 to the output drive to the tines 22, the output drive including power transmission output shaft 108 and the above described drive train to the tines 22.

More specifically, when pinion 90 is operated by engine 11 to be constantly driven, say, in a clockwise direction as viewed in FIG. 2, two face gears 110, 112, supported for rotation about transmission output shaft 108, are respectively driven in opposite directions. A clutch control lever 118 may be manually rotated by retracting a bowden wire 120 connected to operating lever 122 conveniently mounted on handle bar 34 to effect a desired counterclockwise drive to wheels 17, 18 and tines 22 for the frontcultivating mode. Clutch control lever 118 is a component of a drive select mechanism 124 (best seen in FIGS. 3 and 4) and is fixed to an exposed end of clutch control shaft 126 rotatably supported within gear box 128. A clutch arm assembly or clutch actuator 130 is secured to an end of shaft 126 opposite lever 118 and engages a clutch spring 134 which drivingly connects face gear 112 to shaft 108 to effect the desired counterclockwise rotation of wheels 17, 18 and tines 22 with the bowden wire 120 retracted.

Should it be desired to rotate wheels 17, 18 and tines 22 in a clockwise direction (which would be in reverse when handle bar 34 is in its broken line position 38 in FIG. 1 in the cultivating mode), the operating lever 122 is reversely shifted to advance bowden wire 120. This action rotates clutch control lever 118 to move clutch actuator 130 into its full line actuating position 136 in FIGS. 3 and 4 from its broken line actuating position 138 in FIG. 4 to engage free wraps of clutch spring 132 of the other power take-off assembly 102, thereby disengaging clutch spring 134 and effecting clutching engagement between face gear 110 and transmission output shaft 108 to effect the desired clockwise rotation (as viewed in FIG. 1) of wheels 17, 18 and tines 22.

The reversible power transmission 12 and its specific construction comprise the subject matter of copending U.S. patent application Ser. No. 967,412 filed Dec. 7, 1978, now U.S. Pat. No. 4,237,986, in the name of Douglas E. Allen entitled "Reversible Drive Assembly for Combination Tiller and Cultivator" and assigned to the assignee of this invention.

FIGS. 5–7 illustrate a preferred embodiment of a drive control or transmission drive selector of this invention. In the disclosed transmission drive selector, a customized control is provided which promotes the natural tendency of an operator to move an operating control in a direction corresponding to the direction in which the operator desires the machine to move. E.g., if it is desired to propel the machine forwardly in a direction away from the operator, the operating control is more naturally moved in a direction of desired machine movement.

To effect such operating control, the transmission drive selector of this invention features control means 140 which is normally in neutral position and movable from that neutral position to opposite forward and reverse operating positions respectively actuating the transmission 12 in opposite power modes. Moreover, when handle bar 34 in its rear tilling position 37 (FIG. 1) or when it is in its front cultivating position 38, control means 140 is movable away from the operator into a forward operating position in both positions 37 and 38 of handle bar 34 to cause transmission 12 to be actuated in a forward power mode.

Bowden wire 120 is secured at its opposite ends 120A (FIG. 6) and 120B (FIG. 3) to establish a control connection between pivotable control arm 122 and transmission 12. When handle bar 34 is in its front cultivating position 38A (FIG. 2) and arm 122 is in its neutral position (FIGS. 5–7), roller 144 of drive select mechanism 124 is positioned on boss 146 of hub 148 fixed to shaft 108, thereby disengaging transmission 12 with arm 122 in neutral position. When arm 122 is then moved away from the operator to retract wire 120, the lever 118 moves to rotate clutch control shaft 126 and move roller 144 into engagement with clutch spring 134 to effect a drive connection between face gear 112 and transmission output shaft 108 to establish counterclockwise movement of wheels 17, 18 and tines 22 which effects forward movement of the machine with handle bar 34 in its front cultivating position 38A (FIG. 2).

In addition to control arm 122, control means 140 includes a pair of control lever 150, 152 supported for movement about pivot 154 for the control arm 122 which pivot 154 is mounted in fixed relation to handle bar 34 on a subassembly frame 156 secured to handle bar 34. The pivot 154 is established by a nut 158 and screw 160 which extends through subassembly frame 156 and through a central opening in control arm 122.

The control levers 150, 152 are provided respectively with neutral detent means or cutouts 162, 162A formed within subassembly frame 156. As best seen in FIG. 7, uppermost control lever 150 is movable downwardly from its illustrated inoperative position within cutout 162 toward control arm 122 to effect a drive connection therewith by means of an opening 164 in the control lever 150 which registers with an upstanding pin 166 carried by control arm 122. Lever 150 accordingly may be moved downwardly against the biasing action of a pair of Bellville springs 168 and out of engagement with the subassembly frame 156 surrounding cutout 162. With the control lever 150 so engaged with the arm 122, that lever 150 may then be readily moved by handle 172 in forward or reverse directions relative to an operator to establish a forward or reverse transmission mode as desired.

It will be understood that the desired lever/arm connection is established in either handle bar position 37 or 38 depending on which control lever 150, 152 overlies arm 122, and notched cutouts 162, 162A, provide neutral detent means for the control levers 150, 152 and establish an inoperative position for those levers. In such inoperative position, the overlying lever, 150 or 152 depending on the handle bar position, is engageable with control arm 122 in its neutral position (as best seen in FIG. 6) for moving arm 122 away from and toward an operator for selectively establishing the forward and reverse transmission modes upon moving the uppermost lever downwardly into driving engagement with control arm 122.

Referring again to FIG. 7, a second notched opening in subassembly frame 156 provides a cutout 174 which serves as second detent means for control lever 150 to temporarily maintain the control arm 122 and the engaged control lever 150 in a forward operating position disposed away from the operator and establishing a forward transmission mode, springs 168A serving to maintain control arm 122 in engagement with lever 150.

In the specifically illustrated embodiment, a suitable torsion spring 176 is wound about pin 178 secured to subassembly frame 156 with free ends of spring 176 engaging control arm 122 to automatically return it and the engaged control lever into their respective neutral and inoperative positions. Upon manual release of the engaged control lever 150, e.g., from its reverse operating position establishing the reverse transmission mode, the spring 176 automatically provides a dead man return of the control arm 122 for purposes of operator safety. I.e., the lever 150 is free to slide along uninterrupted surface 180 until it reaches notched cutout 162, whereupon springs 168 drive lever 150 upwardly into inoperative position whereby control arm 122 is automatically released in its illustrated neutral position. For completeness, it will be noted that when the control lever 150 is in its forward position and handle 172 is pressed downwardly into noninterfering relation with cutout 174, the handle 172 may be readily moved to return arm 122 to neutral position, the springs 168 urging lever 150 into neutral detent or cutout 162 whereupon control arm 122 is automatically disengaged in neutral.

In the specifically illustrated embodiment, the control levers 150, 152 are shown in stacked spaced relation to one another wth the control arm 122 interposed between the levers 150, 152 in lapping relation thereto. Accordingly, at least one of the control levers 150, 152 will overlie the control lever 150, 152 in either selected handle bar position 37 or 38. Each control lever 150, 152 has a handle 172, 172A for manual manipulation of its respective lever 150, 152, and the handles of the control levers are disposed in opposed reversed relation to one another on handle bar 34. The detent means and lever/arm connection 164A, 166A, for lever 152 within subassembly frame 156 is similar but reversely oriented relative to the first described detent means 162, 174 for lever 150 and its lever/arm connection 164, 166.

Bowden wire 120 accordingly will be respectively advanced and retracted upon advancing handles 172A and 172 respectively in the rear tilling and front cultivating positions 37 and 38 of handle bar 34. Such advancement and retraction of bowden wire 120 automatically causes drive select mechanism 124 to effect clockwise and counterclockwise movement respectively of wheels 17, 18 and tines 22. Shifting of bowden wire 120 by movement of control lever 122 into inoperative position will automatically return the drive select mechanism 124 such that its roller 144 engages boss 146 of hub 148 to automatically disengage transmission 12. As noted above, the machine may be operated in reverse in both tilling and cultivating modes by reversing the control lever position.

As will be apparent to persons skilled in the art, various modifications, adaptations and variations of the foregoing specific disclosure can be made without departing from the teachings of this invention.

I claim:

1. A combination tiller and cultivator machine comprising an engine and rotatable tines mounted on opposite ends of a frame, a pair of drive wheels on opposite sides of the frame between the engine and tines, a reversible transmission mounted on the frame for drivingly connecting the engine to the wheels and the tines for rotating the wheels and the tines in selected angular directions, a handle bar pivotally supported on the frame for movement between a first position overlying the tines and a second position overlying the engine, and a transmission drive selector including a control arm rotatably supported on a pivot mounted in fixed relation to the handle bar, a spring biasing the control arm into a normally neutral position, a control connection between the control arm and transmission, the control connection disengaging the transmission when the control arm is in neutral position and engaging the transmission in forward and reverse modes when the control arm is moved away from and toward an operator respectively into opposite forward and reverse operating positions of the control arm in both the first and second positions of the handle bar, first and second control levers supported on the pivot in stacked relation to the control arm with the control arm interposed between the control levers, and detent means on the handle bar for maintaining the control levers individually in an inoperative position, the levers in inoperative position being alternatively engageable with the control arm in neutral position for moving the arm away from and toward an operator for selectively establishing forward and reverse transmission modes.

2. The machine of claim 1 wherein second detent means are provided for each control lever for temporarily maintaining the control arm and engaged control lever in said forward operating position disposed away from an operator establishing the transmission in a forward transmission mode.

3. The machine of claim 2 wherein the spring automatically returns the control arm and the control lever engaged therewith into their respective neutral and inoperative positions upon release of the engaged control lever from said reverse operating position establishing said reverse transmission mode.

4. The machine of claim 1 wherein the first lever and the second lever are alternately disposed in overlying relation to the control arm when the handle bar is in its first position and in its second position respectively.

5. The machine of claim 4 wherein the control lever in overlying relation to the control arm in a selected handle bar position is engageable with control arm for movement toward and away from an operator for respectively selecting reverse and forward transmission modes, and wherein the other control lever is in underlying relation to the control arm and is maintained by the detent means in said inoperative position.

6. The machine of claim 4 wherein a releasable connection is provided between the control arm and each control lever, the releasable connection being movable from a normally released inoperative condition into an engaged operating condition upon moving said overlying lever downwardly from its inoperative position into engagement with the control arm.

7. The machine of claim 1 wherein the control levers each have a handle for manual manipulation of its respective lever, the handles of the control levers being disposed in opposed reversed relation to one another on the handle bar.

8. A combination tiller and cultivator machine comprising an engine and rotatable tines mounted on opposite ends of a frame, a pair of drive wheels on opposite sides of the frame, a reversible transmission mounted on the frame for drivingly connecting the engine to the wheels and the tines for rotating the wheels and the tines in selected angular directions, a handle bar with means pivotally supporting the same on the frame for movement about a horizontal transverse axis between a first position overlying one end of the frame and a second position overlying the opposite end of the frame, and a transmission drive selector including control means mounted on the handle bar and connected to the transmission, the control means being biased into a normally neutral position, disengaging the transmission, and manually movable from neutral to opposite forward and reverse operating positions for respectively actuating the transmission into forward and reverse power modes, first detent means on the handle bar for maintaining the control means in said neutral position, the control means being manually movable away from the operator into forward position in both the first and second positions of the handle bar, and second detent means cooperating with the control means for temporarily maintaining the control means in said forward position in both first and second positions of the handle bar in a forward transmission power mode.

* * * * *